United States Patent [19]
Varney

[11] Patent Number: 5,141,727
[45] Date of Patent: Aug. 25, 1992

[54] FLUE GAS TREATMENT

[76] Inventor: John W. Varney, M.B.B. Mechanical Services, P.O. Box 39, Lakeside, Nova Scoita, Canada, B0J 1Z0

[21] Appl. No.: 709,299

[22] Filed: Jun. 3, 1991

[51] Int. Cl.⁵ .......................................... C01B 17/00
[52] U.S. Cl. .................................................. 423/242
[58] Field of Search ............ 423/242 A, 242 R, 512 A

[56] References Cited
U.S. PATENT DOCUMENTS
3,389,829 6/1968 Stanford ............................... 423/242
3,899,099 8/1975 Oiestad ................................ 423/242

Primary Examiner—Gregory A. Heller
Attorney, Agent, or Firm—McConnell and Fox

[57] ABSTRACT

A flue gas treatment system is provided which extracts most of the heat from the flue gas before scrubbing with large volumes of sea water. The scrubber liquids are sufficiently dilute that they can be safely returned to deep sea location while the scrubbed gases when mixed with sufficient volumes of ambient air can be directly returned to atmosphere without distribution by a large stack.

2 Claims, 4 Drawing Sheets

– 1 –

FLUE GAS TREATMENT

FIELD OF THE INVENTION

This invention relates to the treatment of flue gas and in particular to wet scrubbers for removing noxious material from gaseous effluent of combustion systems.

DESCRIPTION OF THE PRIOR ART

The removal of noxious material from the flue gas of combusters has been long studied. In particular, efforts have been made to remove acidic gases such as $SO_2$ from the flue gas. Such removal systems include chemical processes for combining the sulphur dioxide with other material such as calcium and magnesium, for example, by treating the flue gas with ground dolomite. Such processes may be wet or dry. In the case of wet processes commonly including wet scrubbing, the amount of reclaimed material eventually becomes a disposal problem and the process for reclaiming the solids from the scrub water used in the wet scrubber is power consuming. Generally such processes minimize the amount of water used in the scrubber in order to concentrate the used chemicals as much as possible and thus reduce the trouble and expense of reclaiming the solids.

In cases where the combuster is in the neighbourhood of a large body of water, such as adjacent the ocean, it has been proposed in the past to use the sea water both for cooling the condenser of the power plant and also for use within the wet scrubber. It has been suggested that the effluent coming out of the scrubber can then be returned directly to the ocean, however, studies have indicated that, at the ratio of water to contaminants usually encountered, this might have a deleterious effect on the environment.

To overcome these problems it has been suggested to add to the sea water other chemicals such as ground dolomite and process effluent in such a manner that the product is immediately dissolved in the sea water and is not returned in the solid state. (See, for example, the report of Abrams, Zaczet, Benz, Awerbuch, Haidinger, reported in JAPCA Control Technology July 1988, Volume 38, No. 7).

All of these processes require additional chemicals and expensive equipment to produce a somewhat complex system for removal of the noxious material. In addition, energy is required to reheat the gaseous effluent to cause it to rise up the stack for disposal.

It is an object of my invention to overcome the foregoing difficulties, maximizing the efficiency of the system, minimizing the complexity and eliminating any need for solid waste disposal from the latter portion of the flue gas treatment process.

SUMMARY OF THE INVENTION

In accordance with the present invention, the flue gas is processed in the normal manner to remove particulates as much as possible either through precipitators or bag filters. Heat reclamation is used to transfer heat from the flue gases to the condensate for reintroduction to the boiler and also to transfer heat from the flue gases to the incoming combustion air. Sufficient heat transfer is supplied to reduce the temperature of the flue gas almost to ambient temperature. Flue gas is then passed through a sea water scrubbing tower using large quantities of cold sea water in counterflow. The chilled and scrubbed flue gas is mixed with fresh air and returned directly to the ambient without being passed through a stack. The sea water from the scrubber is returned directly to a deep sea location carrying with it the dissolved gases or chemical products from the scrubber. To attenuate the acidity and also any oxygen deficiency of the water from the scrubber it is essential that the outflow be dynamically mixed with large volumes of ocean water via a long perforated conduit.

A clearer understanding of my invention may be had from a consideration of the following description and drawings in which:

DESCRIPTION OF A PREFERRED EMBODIMENT

Figure 1:
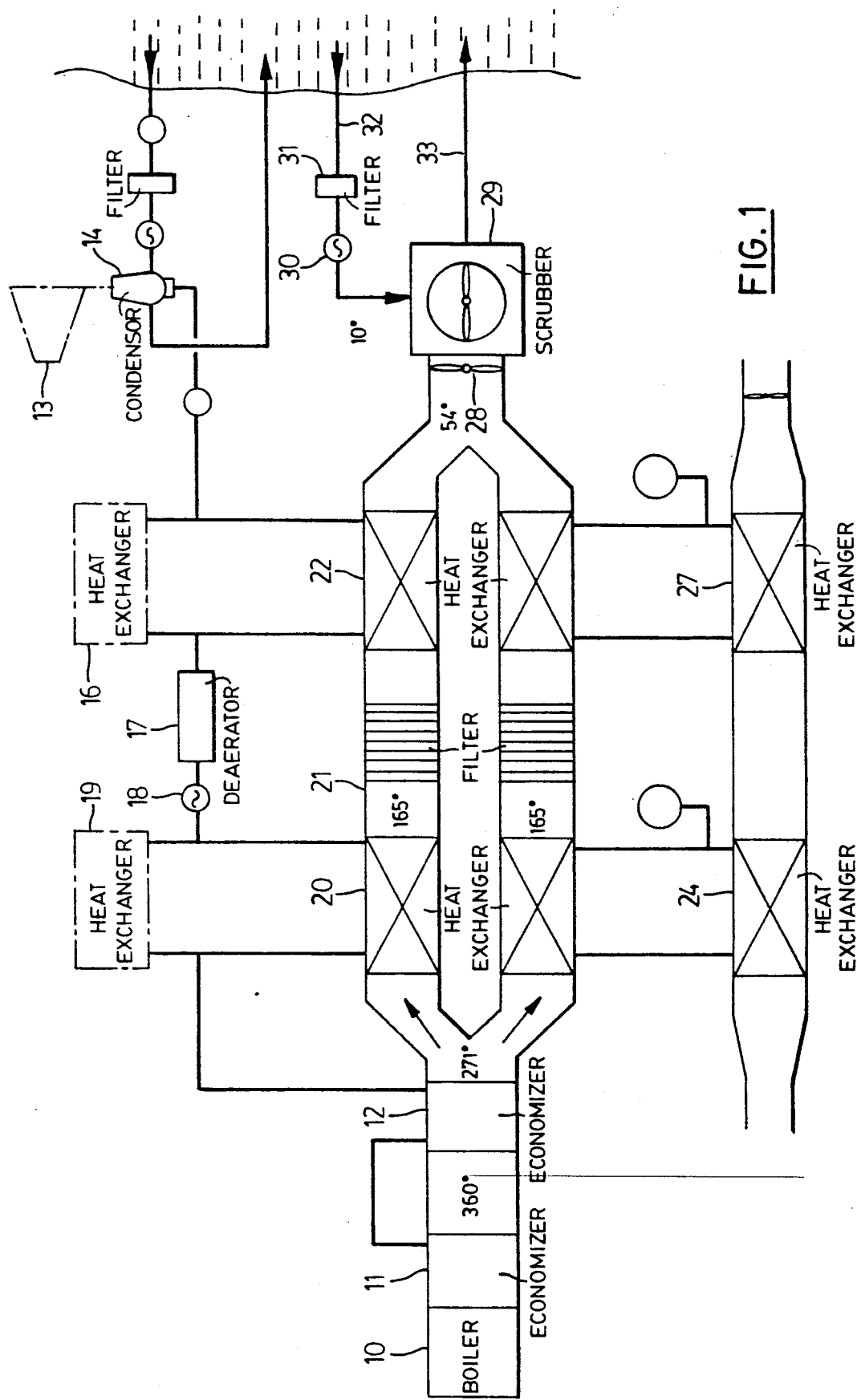
FIG. 1 is a schematic diagram of a power system incorporating my invention.

Considering first FIG. 1, there is shown a standard boiler 10 followed by an economizer 11 both of which are normal components of a steam generating system. The boiler provides steam through an additional economizer 12 to turbines and then eventually to a low pressure section of the turbine designated 13 which is connected to a condenser 14. The condensate from the condenser is returned in the normal manner through an extraction pump and feed heaters to the boiler. To this point the system is a standard system with only the addition of a further economizer 12. It will be seen that the condensate in returning to the boiler is passed through normal low pressure bleed feed heater 16 deaerator 17 and injection pump 18 and high pressure bleed feed heater 19. The flue gas circuit on the other hand contains some additional heat exchangers and it will be seen is split into two channels. The upper channel incorporates an extended surface heat exchanger 20 for preheating the feed similar to the existing high pressure bleed feed heater 19. This feed heater 20 extracts heat from the flue gas, the gas is then passed through a particulate filter 21, such as a precipitator or bag house. If the flue gas contains particulate matter it is . removed at this stage. A further feed heater of suitably corrosion resistant material, such as titanium, designated 22, transfers heat from the flue gas to the feed and reduces the temperature of the flue gas to almost ambient temperature.

Figure 2:
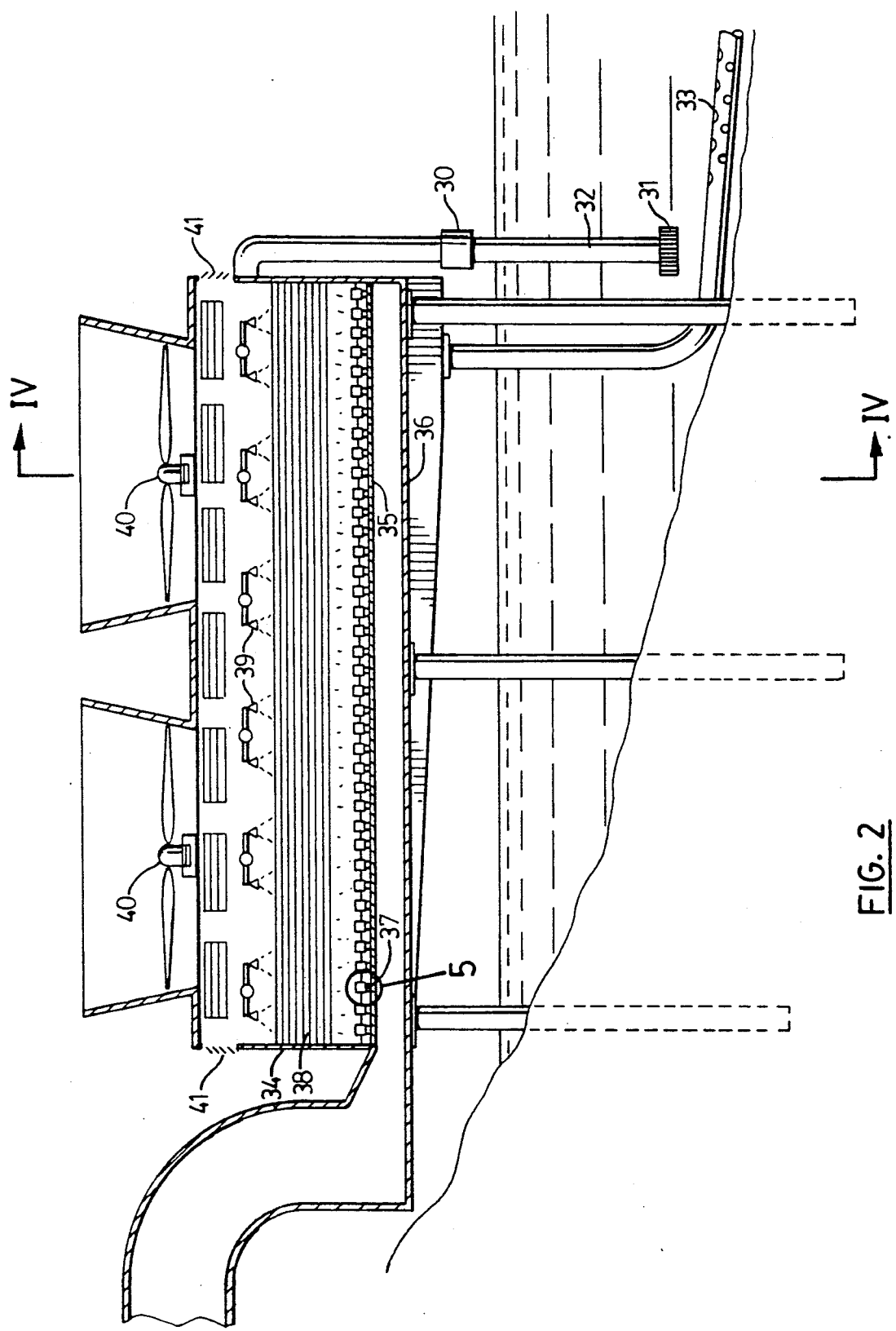
FIG. 2 is an elevational view, partially in section, of a wet scrubber for use in the system shown in FIG. 1.
Figure 3:
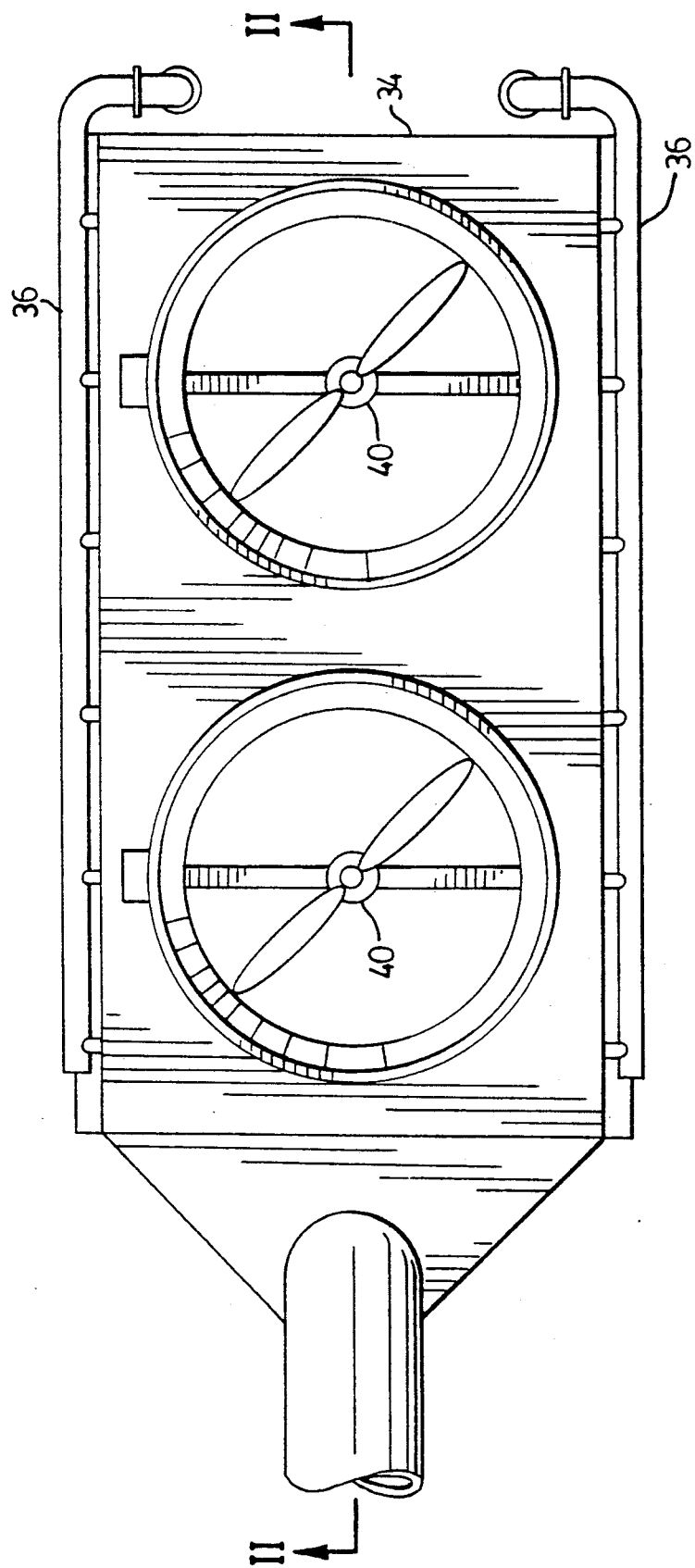
FIG. 3 is a plan view of the scrubber of FIG. 2.
Figure 4:
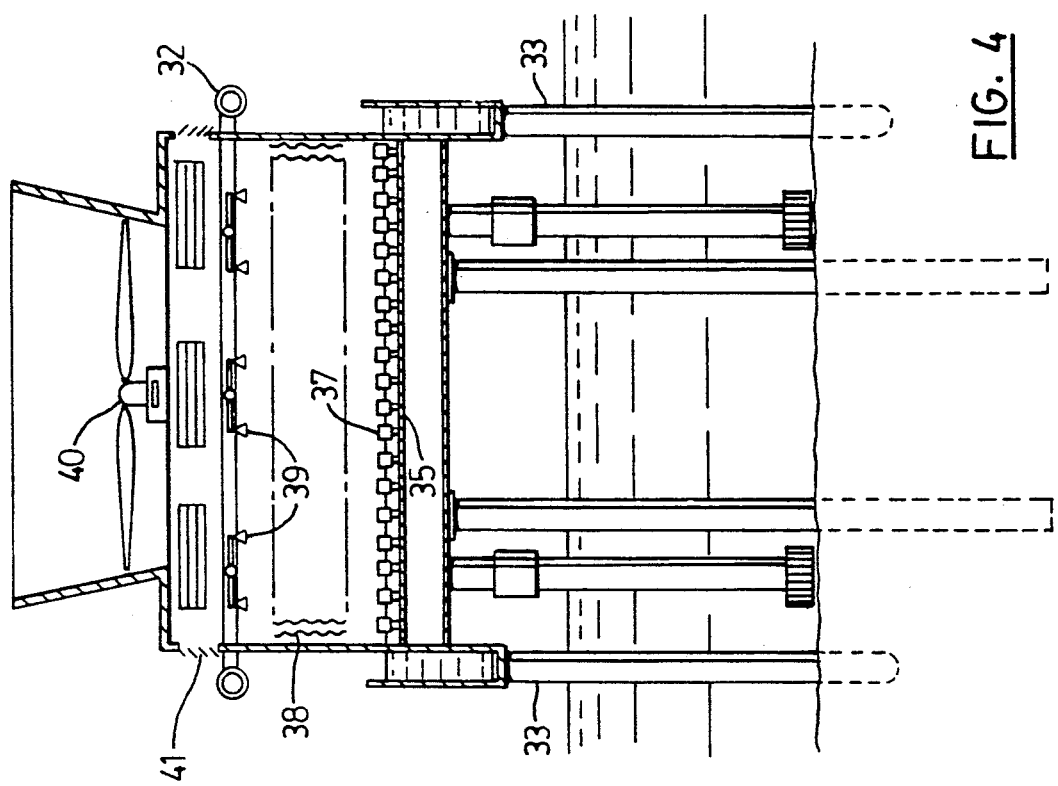
FIG. 4 is a sectional view of the scrubber of FIG. 2 at Section IV—IV.
Figure 5:
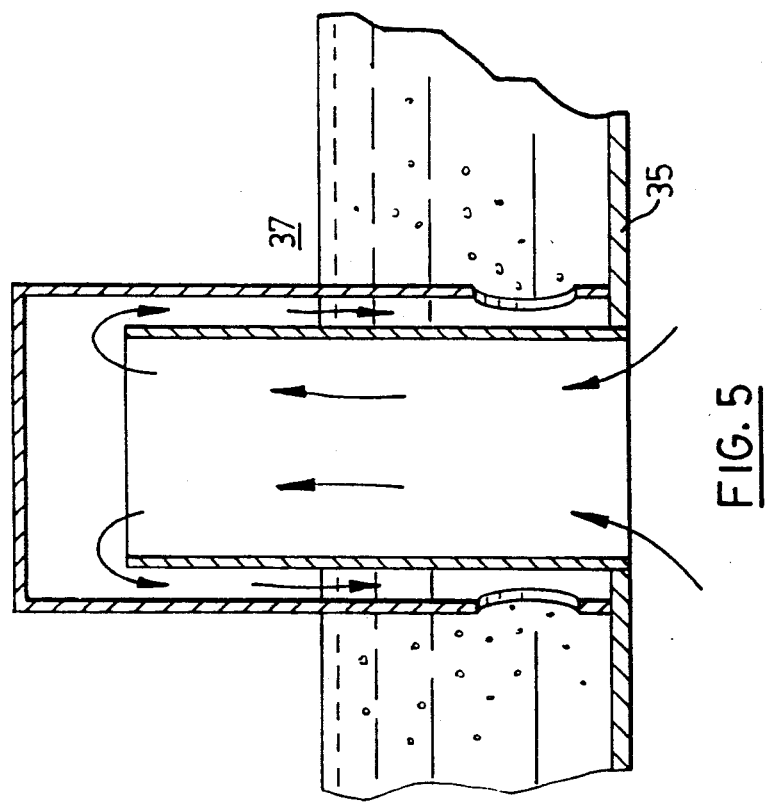
FIG. 5 is a sectional detail of item 37 of FIG. 2.

The parallel path, that is the lower path on the figure, also passes the flue gas through heat exchangers which supply heat to the combustion air. Heat exchanger 23 consists of an extended surface heat exchanger in the flue gas duct which is coupled through a fluid loop to an extended heat exchanger surface in the combustion air duct designated 24. Flue gas then passes through the particulate separator 25 corresponding to the separator in the upper duct which removes solids from the flue gas, such as fly ash, and may consist of a bag house, precipitator or other solid component extractor. The cooled gas then proceeds through heat exchanger 26, which corresponds to heat exchanger 22 in the upper duct and consists of a corrosion resistant bare tube heat exchanger, formed preferably of titanium, which is coupled through a fluid loop to a heat exchanger 27 in the combustion air duct. The outputs of heat exchangers 22 and 26, that is the flow through the upper and lower flue gas ducts, are combined and impelled by a fan 28 through the scrubber tower 29, shown in more detail in FIG. 2, and the output from the scrubber tower is directly returned to atmosphere.

As will be seen, the condenser 14 utilizes a source of cold water, this is the normal coolant supply for a condenser and includes whatever filtration and pumping is necessary to provide the flow to the condenser. A corresponding system is provided including intake pump 30 and filter equipment 31 to supply low temperature sea water from intake pipe 32 to the scrubber tower 27. The sea water after passing through the scrubber tower is returned through the outflow pipe 33 to a deep water location. Both the intake pipe 32 and the outlet pipe 33 are situated in a deep water location.

In operation, the system resembles other steam generating power installations in that the steam generated is used to provide motive power for electrical generaters. The additional heat exchangers add to the economy of the system while cooling the flue gas to near ambient temperature. It will be seen that the typical temperatures indicated on the ducts for the flue gas started with a flue temperature of 271° C. which after passing through the first heat exchangers 20 and 22 is reduced to about 166° C., and after passing through the second heat exchangers 21 and 24 is reducted to 54° C. which is close to ambient. The gas at this temperature is then passed into the scrubber tower.

Turning to FIGS. 2-5, it will be seen that the scrubber tower consists of an enclosure having side walls 34 which define a space adequate to receive the full flow of the flue gases with minimal pressure loss in the scrubber. A lower wall 35 defines a lower chamber which contains a bath of sea water. Flue gas is bubbled into the sea water through ducts 36 and nozzles 37. The nozzles 37 project from the duct 36 to a point below the surface of the sea water bath. The flue gas, after bubbling through the sea water, passes upward through corrugated plastic fill 38. The plastic fill may consist of corrugated polyvinyl chloride the vertical sheets of which provide minimal obstruction to the gas and fluid flow but greatly increase the surface contact between the fluid and the gas. Sea water from the intake and filter equipment 31 are applied through spray nozzles 39 in a downward direction over the plastic fill in counterflow to the flue gas. The flue gas is then sucked up by impeller 40 and discharged into the atmosphere. At the same time, a substantial quantity of fresh air is sucked into the upper part of the scrubber through vents 41 and the output from the impeller 40 is a mixture of flue gas and induced air.

OPERATION

In operation, as has been previously pointed out, the flue gas, at a temperature of 54° C. for example, is introduced into the lower portion of the scrubber and bubbles through the sea water. The sea water which is preferably 10° C. or lower is brought into intimate contact with the flue gas both through the bubbling operation and through the spray and plastic fill segment of the scrubber. All soluable materials in the flue gas are dissolved in the sea water to a less or greater degree depending on the temperature of the sea water, the exposure of the flue gas to the sea water surface and the pressures. Ideally 98% of the sulphur dioxide is either passed into solution or combined with chemicals in the sea water to produce a solution which runs out the bottom of the scrubber tower to the deep water outflow 33. Some carbon dioxide is also passed into solution into the sea water while other chemical contents such as sodium, silicon, vanadium, are combined in soluble material or suspension and pass into the sea water. The remaining solids, such as carbon particulate, is also carried by the sea water in suspension. All these materials are returned to the deep water outflow so that the gases remain in solution as much as possible. In order to produce the desired extraction percentages it is necessary that the sea water flow be large in comparison to the flue gas flow and it has been found that sea water flow in the neighbourhood of twelve parts by weight compared to one part by weight of flue gas is necessary to obtain the best results. The outflow of flue gas will contain almost no noxious substances, the only difference between the flue gas and normal atmospheric air will be a reduction in the oxygen content, an increase in carbon dioxide, and some small percentage of sulphur dioxide. However, dilution of the flue gas with air in the upper part of the scrubber reduces the proportion of undesirable gases to such an extent that the returned air, which is returned directly to atmosphere at this point, is acceptable. It is necessary that a substantial portion of ordinary fresh ambient air be mixed with the flue gas to reduce the percentages even further. An addition of ten parts of fresh air to each part of flue gas has been indicated as desirable proportion.

It will be seen that the present system differs from prior wet scrubbers in that there is no solid removal from the fluid outflow of the scrubber. All the material is either in solution or suspension and when returned to a deep water location remains in solution or suspension to a large degree and is deemed to be environmentally harmless. In order that this system operate, it is essential that the proportion of sea water to flue gas be much greater than was previously proposed. It is also essential that the products produced, so far as possible, are water soluble thus eliminating the problems of scale precipitation in the scrubber. Previous systems have minimized the fluid flow through the scrubber in order to extract the solids from the fluid, in this case, however, the fluid flow is maximized to reduce the solid content and indeed, so far as possible, no solids are produced, the output being gaseous. It will also be seen that the scrubbed flue gas will contain minimum noxious substance and indeed, because of the very low percentage of $SO_2$ remaining in the flue gas and because of the substantial scrubbing action and further, due to the admixture of fresh air, the output from the scrubber is safely released into the atmosphere.

Typical scrubber dimensions and flows for a power station would be 1.5 square meters with a flow of 725 liters per minute of sea water per megawatt of power. Flue gas flow would typically be 3600 kilograms per hour with 36,000 kilograms of mixing air per hour per megawatt power. While these numbers are typical, variations can be made as found desirable depending on location and temperature of the available sea water.

While certain ratios of sea water to flue gas have been proposed, it is evident that these may be varied to produce the desired reduction of noxious components in the flue gas and control the contaminant levels in the returned sea water to fall within the permitted environmental restrictions of the particular location. Similarly, the volume of mixing air introduced may be increased or decreased depending upon the actual analysis of the scrubbed gas.

It will also be noted that the sea water intake and outlet are located about 10 meters below the minimum water level. This may vary, but the temperature necessary to hold gases in solution and the depth necessary to provide both this desired temperature and the pressure necessary to maintain gas in solution will vary depending on circumstances in a manner well understood by those skilled in the art.

I claim:

1. A nonpolluting desulphurization process for flue gas comprising cooling the gas to a temperature approaching ambient, reclaiming the heat extracted in the cooling process, passing the so cooled gas through a reverse flow scrubber where it is moved in intimate contact with a volume of sea water equal to at least twelve times by weight the volume of flue gas and below about 10° C., mixing the so scrubbed gas with a volume of ambient air at least equal to ten times by volume the volume of flue gas and returning the mixed gas and air directly to the atmosphere.

2. A process as claimed in claim 1 where the sea water is returned to a depth of at least about 10 meters below the sea level.

* * * * *